United States Patent
Motzer et al.

(10) Patent No.: US 7,872,610 B2
(45) Date of Patent: Jan. 18, 2011

(54) METALLISED PLASTIC ANTENNA FUNNEL FOR A FILL LEVEL RADAR

(75) Inventors: Juergen Motzer, Gengenbach (DE); Josef Fehrenbach, Haslach (DE); Klaus Kienzle, Zell am Harmersbach (DE); Christian Sum, Wolfach (DE)

(73) Assignee: VEGA Grieshaber KG, Wolfach (DE)

( * ) Notice: Subject to any disclaimer, the term of this patent is extended or adjusted under 35 U.S.C. 154(b) by 1097 days.

(21) Appl. No.: 11/601,228

(22) Filed: Nov. 17, 2006

(65) Prior Publication Data

US 2007/0115196 A1 May 24, 2007

Related U.S. Application Data

(60) Provisional application No. 60/740,228, filed on Nov. 28, 2005.

(30) Foreign Application Priority Data

Nov. 24, 2005 (DE) .................. 10 2005 056 042

(51) Int. Cl.
*H01Q 13/00* (2006.01)

(52) U.S. Cl. .............. 343/785; 343/786; 343/841

(58) Field of Classification Search .......... 343/785, 343/786, 841
See application file for complete search history.

(56) References Cited

U.S. PATENT DOCUMENTS

| | | | | |
|---|---|---|---|---|
| 2,596,190 | A * | 5/1952 | Wiley | 343/783 |
| 3,646,565 | A * | 2/1972 | Robinson et al. | 343/781 R |
| 5,594,449 | A | 1/1997 | Otto | |
| 6,023,246 | A * | 2/2000 | Tanabe | 343/753 |
| 6,661,389 | B2 * | 12/2003 | Griessbaum et al. | 343/786 |
| 6,977,624 | B1 * | 12/2005 | Szente et al. | 343/834 |
| 7,308,270 | B2 * | 12/2007 | Lastinger et al. | 455/450 |
| 2003/0179148 | A1 | 9/2003 | Ohlsson | |

FOREIGN PATENT DOCUMENTS

| | | |
|---|---|---|
| CN | 1 476 652 | 2/2004 |
| DE | 82 00 557 | 9/1983 |
| DE | 36 01 040 | 10/1986 |
| DE | 43 364 94 | 4/1995 |
| DE | 197 03 346 | 11/1997 |
| DE | 201 10 399 | 4/2002 |
| DE | 103 54 754 | 6/2005 |
| DE | 10 2004 003 010 | 8/2005 |
| DE | 20 2005 008 528 | 9/2005 |
| DE | 10 2005 022 493 | 11/2006 |
| EP | 0 162 821 | 11/1985 |
| EP | 0 871 241 | 10/1998 |
| EP | 1 076 380 | 2/2001 |
| JP | 55 087 965 | 3/1980 |
| JP | 60 236 505 | 11/1985 |
| WO | 90/13927 | 11/1990 |
| WO | 02/41446 | 5/2002 |
| WO | 2006/063930 | 6/2006 |

* cited by examiner

*Primary Examiner*—Tan Ho
(74) *Attorney, Agent, or Firm*—Fay Kaplun & Marcin, LLP

(57) ABSTRACT

A metalized plastic antenna includes a plastic antenna body with metallization on the inside. In this arrangement metallization is used for conducting electromagnetic waves. Furthermore, metallization may be implemented as a protective coating so that chemical resistance of the plastic antenna may be ensured even in the case of corrosive environmental conditions.

25 Claims, 3 Drawing Sheets

METALLISED PLASTIC ANTENNA FUNNEL FOR A FILL LEVEL RADAR

RELATED APPLICATIONS

This application claims the benefit of the filing date of the U.S.-Provisional Application Ser. No. 60/740,228 filed on Nov. 28, 2005 and of the German Patent Application Serial No. 10 2005 056 042.3 filed on Nov. 24, 2005, the disclosure of which both is hereby incorporated by reference.

FIELD OF THE INVENTION

The present invention relates to fill level measuring. In particular, the present invention relates to a metallised plastic antenna for a fill level radar, a fill level radar to determine the fill level in a tank, the use of such a metallised plastic antenna for fill level measuring, as well as to a method for producing such a metallised plastic antenna.

TECHNOLOGICAL BACKGROUND

Known fill level measuring devices comprise parabolic antennas or horn antennas that transmit or receive radar waves or microwaves in order to determine the fill level of a medium in a fill level container. The antenna of such a fill level measuring device is for example arranged within a container or (e.g. in the case of determining the water level) underneath a bridge.

These days such antennas are produced in the form of sheet-metal antennas that are deep drawn and welded accordingly. Furthermore, solid materials made of stainless steel are also used, from which materials the corresponding antennas are turned. Such a production process is mechanically demanding and involves considerable expenditure. Furthermore, the metallic design of such antennas results in very considerable weight, which can have very negative consequences in particular in the case of greatly fluctuating environmental conditions (such as for example considerable wind pressure or considerable acceleration) and can at times result in system failure due to mechanical stress.

SUMMARY OF THE INVENTION

According to an exemplary embodiment of the present invention a metallised plastic antenna for a fill level radar is stated, with the metallised plastic antenna comprising an antenna body, made of a plastic material, with an inside, wherein the inside of the antenna body comprises a metallisation for conducting electromagnetic waves.

Such a plastic antenna is comparatively economical to produce and is light in weight. As a result of the inside metallisation of the antenna body, electromagnetic waves such as for example microwaves or radar waves may be transmitted or received. Furthermore, the metallisation may improve the chemical resistance of the plastic antenna body in that such metallisation envelopes the entire antenna body in the form of a protective coating.

According to a further exemplary embodiment of the present invention the inside of the antenna body forms a hollow space, wherein the hollow space comprises an aperture and is filled at least in part with a filler that closes off the aperture of the hollow space.

The filler in the aperture of the hollow space may be used for stabilising the antenna and may increase the mechanical strength of the antenna. Furthermore, any ingress of condensation water or other impurities into the hollow space may be prevented. The antenna may thus now also be used in environmental conditions for which up to now other types of antennas may have been necessary (such as for example stainless steel antennas). Moreover, as a result of the filler, the pressure resistance to strong external fluctuations in pressure may be improved.

A great variety of materials may be used as a filler. For example a foam may be used, such as e.g. ROHACELL, or a dielectric may be used whose relative permittivity ($\in_r$) is close to that of air. In this way impedance losses may be reduced.

Furthermore, polytetrafluoroethylene (PTFE) or some other thermoplastic material or a glass-fibre reinforced plastic, such as for example polyphenylene sulphide (PPS) or polypropylene (PP) can be provided. Such glass-fibre reinforced plastics may also be used in combination with other suitable materials.

According to a further exemplary embodiment of the present invention the frequency of the electromagnetic waves is between 50 GHz and 100 GHz. In particular, according to a further exemplary embodiment of the present invention the metallised plastic antenna may emit and detect electromagnetic waves with a frequency of between 57 GHz and 64 GHz, or between 75 GHz and 85 GHz.

Of course the antenna may also be dimensioned such that it can transmit or receive electromagnetic waves of frequencies higher than 100 GHz or low-frequency electromagnetic waves, for example with a frequency of between 5 GHz and 30 GHz.

According to a further exemplary embodiment of the present invention the plastic antenna is designed as a horn antenna or as a parabolic antenna.

In the case of a parabolic antenna, the inside of the antenna body, which inside comprises metallisation, is the active side of the antenna body (in other words the side that is directed towards the contents and which is used for the radiation or detection of the electromagnetic waves).

According to a further exemplary embodiment of the present invention the antenna body comprises glass-fibre reinforced plastic. This may, for example, be polybutylene therapthalate (PBT) with a glass fibre content of approximately 30%. This glass fibre content is added to provide stability. Of course, the glass fibre content may also be different; e.g., depending on requirements, it may be between 20 and 30% or between 30 and 40%. Other glass fibre percentages may also be possible and desirable, e.g. in order to achieve an increase in mechanical strength.

According to a further exemplary embodiment of the present invention metallisation of the inside of the antenna body comprises a varnish coating that has been enriched with conductive elements.

According to one exemplary embodiment of the present invention the varnish coating comprises metal-filled conductive varnishes, for example copper-silver conductive varnish.

According to a further exemplary embodiment of the present invention metallisation of the inside of the antenna body has been applied as a high-vacuum vapour-deposit layer. Of course, the metallisation may also take place at normal pressure or in a normal vacuum. However, high-vacuum vapour depositing may result in improved purity of metallisation.

According to a further exemplary embodiment of the present invention metallisation of the inside of the antenna body has been applied as a chemical electroplating layer.

For example, stainless steel may be used as a coating material; however, other materials may also be possible, for example mixtures or alloys comprising aluminium, copper, nickel, tin or chrome. Furthermore, metallisation may be carried out using precious metals, such as for example gold or platinum.

According to a further exemplary embodiment of the present invention the metallised plastic antenna further comprises an encapsulation for closing off the aperture of the hollow space, wherein encapsulation is designed to provide chemical protection to the inside of the antenna body against external influences.

In this way resistance of the inside of the antenna to aggressive materials may be ensured. In this arrangement encapsulation may serve to provide protection against impurities, chemical substances or temperature fluctuations and the like. Moreover, according to a further exemplary embodiment of the present invention, encapsulation may be designed as a lens for focussing the electromagnetic waves.

In this arrangement the lens may, for example, be of an aspherical design. Furthermore, the lens may be designed so as to be spherical, convex or concave, depending on the particular requirement.

According to a further exemplary embodiment of the present invention the metallised plastic antenna further comprises a collar with a connection region, wherein the connection region of the collar comprises a first angle in relation to the longitudinal axis of the collar such that the connection region may be placed against a waveguide so as to provide a seal.

For example, to this effect the waveguide comprises a second angle in relation to the longitudinal axis of the collar (when the antenna is connected to the waveguide). In this arrangement the angle of the waveguide is smaller than the corresponding angle of the antenna collar. On the one hand this may result in a smaller contact area between the waveguide and the antenna collar. On the other hand the arrangement at an angle may facilitate adjustment of the antenna collar relative to the waveguide. The smaller contact area due to the different angle arrangement may facilitate sealing between the waveguide and the antenna because during installation the contact force is distributed over a relatively small area so that the waveguide may for example easily be pressed into the antenna material.

According to a further exemplary embodiment of the present invention the connection region of the plastic antenna is rotationally symmetrical in relation to the longitudinal axis of the collar.

For example, the connection region is conical in design. Correspondingly, the connection region of the waveguide may also be conical in design, however with a more acute (smaller) angle.

According to a further exemplary embodiment of the present invention the metallised plastic antenna furthermore comprises a second layer, wherein the second layer is arranged between the metallisation and the antenna body.

For example, the second layer is a bonding agent, which is designed to increase adhesion of the metallisation to the antenna body. The second layer may also be a layer to provide surface smoothing so that subsequent metallisation is sufficiently smooth.

According to a further exemplary embodiment of the present invention the metallised plastic antenna further comprises a third layer, wherein the third layer is arranged on the metallisation.

This third layer can be designed as a protective layer. For example, it can be a clear varnish layer, a polymerisation layer, e.g. a vapour-deposited plastic or a plasma polymer layer. Of course, other types of layers, too, may be possible and desired.

According to a further exemplary embodiment of the present invention a fill level radar for determining the fill level in a tank is stated, wherein the fill level radar comprises a plastic antenna, as described above, for transmitting and/or receiving electromagnetic waves.

The fill level radar may for example comprise a waveguide for feeding the electromagnetic waves to the antenna, wherein the waveguide comprises a region for connecting the waveguide to the connection region of the plastic antenna, wherein the region of the waveguide in the connected state comprises an angle in relation to the longitudinal axis of the collar of the plastic antenna, which angle is smaller than the corresponding angle of the connection region of the plastic antenna. Furthermore, according to this exemplary embodiment of the present invention the connection region of the plastic antenna may be placed against the region of the waveguide so as to provide a seal.

Furthermore, the use of a plastic antenna according to the invention for fill level measuring is stated.

Moreover, a method for producing a corresponding plastic antenna is stated, comprising the provision of an antenna body made of a plastic material with an inside, and metallisation of the inside of the antenna body for the purpose of conducting electromagnetic waves.

In this way a method is provided by means of which both the production costs and the weight of the fill level radar antenna may be reduced.

According to a further exemplary embodiment of the present invention, prior to metallisation, plasma activation of the inside takes place, wherein metallisation involves a step selected from the group comprising varnish coating, high-vacuum vapour depositing, and chemical electroplating.

Further exemplary embodiments of the invention are stated in the subordinate claims.

Below, exemplary embodiments of the present invention are described with reference to the figures.

DETAILED DESCRIPTION OF EXEMPLARY EMBODIMENTS

Figure 1:
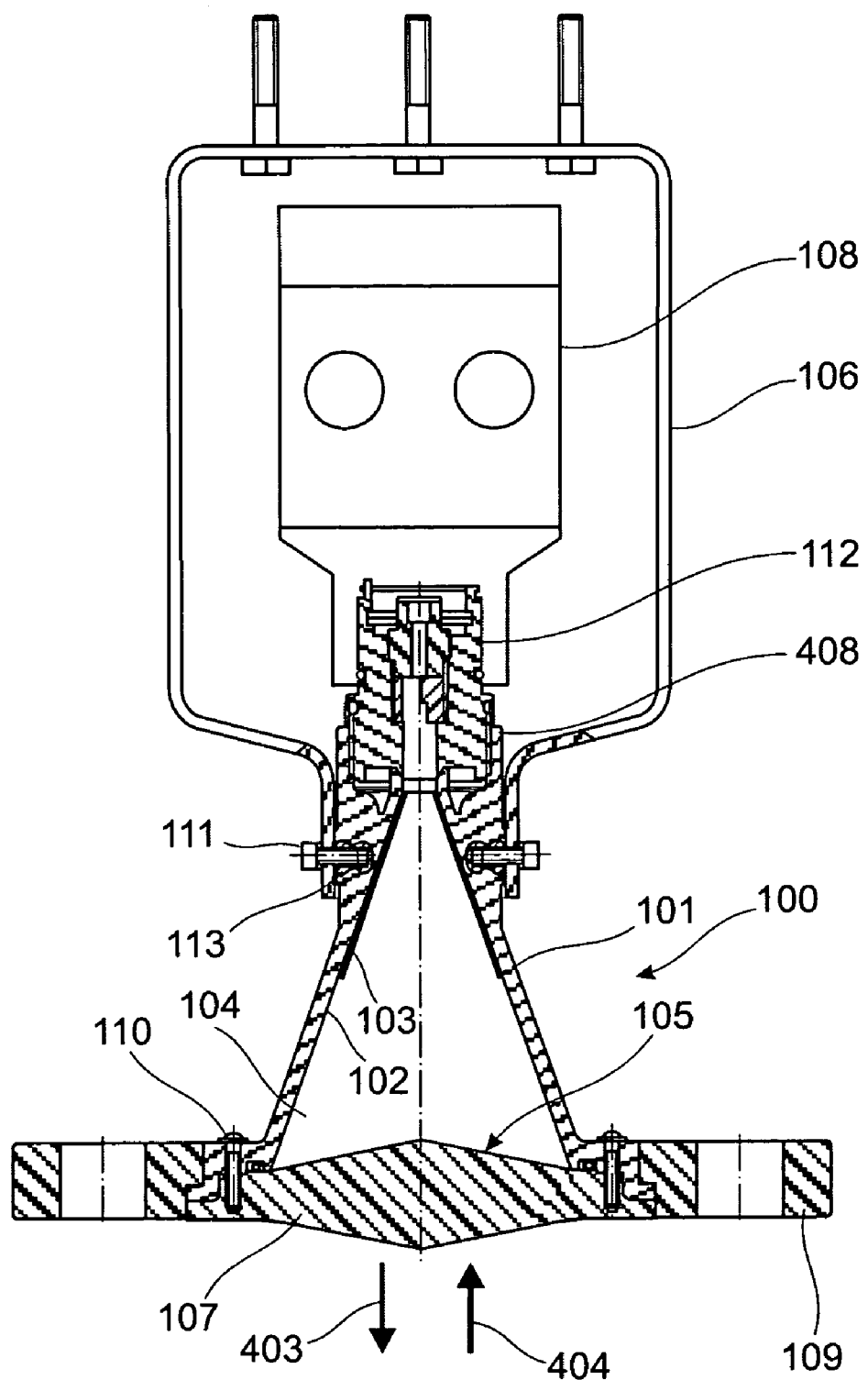
FIG. 1 is a diagrammatic cross-sectional view of a fill level radar according to one exemplary embodiment of the present invention.

The illustrations in the figures are diagrammatic and not to scale.

In the following description of the figures, the same reference characters are used for identical or similar elements.

FIG. 1 is a diagrammatic cross-sectional view of a fill level radar according to one exemplary embodiment of the present invention. As shown in FIG. 1, the fill level radar essentially comprises a metallised plastic antenna 100 and a housing 108 whose interior accommodates an electronics module. Furthermore, a holding shackle 106 is provided.

In this arrangement the plastic antenna 100 is used for transmitting and receiving electromagnetic waves 403, 404. In this arrangement the waves 403 to be transmitted are generated within the electronics and are then fed into the antenna 100 by way of an adapter or connection piece 112 that comprises a waveguide. Conversely, incoming waves 404 are detected by the antenna 100 and are transmitted by way of the connection piece 112 with waveguide to the electronics, where they can subsequently be evaluated accordingly.

The plastic antenna 100 comprises an antenna body 101 with an inside 102. The antenna body 101 comprises a collar 408 that is designed to be connected to a standard device, for example a device from the VEGA housing series.

In order to affix the holding shackle 106 to the antenna 100, apertures 113 are provided in the antenna body, into which apertures 113 sleeves or threaded bushes may be inserted so as to accommodate corresponding attachment elements 111 (for example screws). Moreover, the threaded bushes can also be made using injection technology.

The inside 102 of the antenna body 101 comprises metallisation 103 that has been applied, for example, in the form of a coating of conductive varnish, chemical electroplating or metal vaporisation. In this arrangement the layer 103 may fill the entire hollow space 104 of the plastic antenna 100 or it can fill only some regions (as shown in FIG. 1).

Metallisation may of course also extend to the outside region of the antenna 100, for example in order to provide complete (internal and external) sealing-off of the plastic antenna.

The hollow space 104 of the antenna 100 is closed off or encapsulated from the outside by means of a corresponding cover, such as for example a disc or lens 107. There is thus no need to provide a flange.

The lens 107 serves not only to protect the inside of the antenna, but also to provide a lens effect for focussing or concentrating the electromagnetic waves. In this way a shorter design shape of the funnel can be achieved with the same antenna gain.

The lens comprises, for example, a plastic material such as PTFE, polypropylene, or it comprises glass or a ceramic material.

The lens 107 achieves an optimum radiation angle of the electromagnetic waves 403, i.e. it is used for focussing; said lens 107 can be convex, concave, spherical, aspherical or conical in design. Among other things it is thus possible, overall, to achieve a shorter design of the antenna system under otherwise identical conditions.

In order to reliably seal off the aperture 105 of the antenna 100, attachment means 110 can be provided that connect the lens 107 to the antenna body 101. Attachment can also take place by means of a thread on the outside of the lens.

Furthermore, a flange 109 can be provided in order to affix the fill level radar to a corresponding container.

Such a fill level radar can for example be used also in the case of difficult, corrosive environmental conditions, e.g. in applications in the chemical industry, since the cover 107 provides a reliable seal. There is thus no need for an additional flange for sealing purposes.

In order to attach the fill level radar to a container, the holding shackle 106 can be provided on the collar 408.

Figure 2:
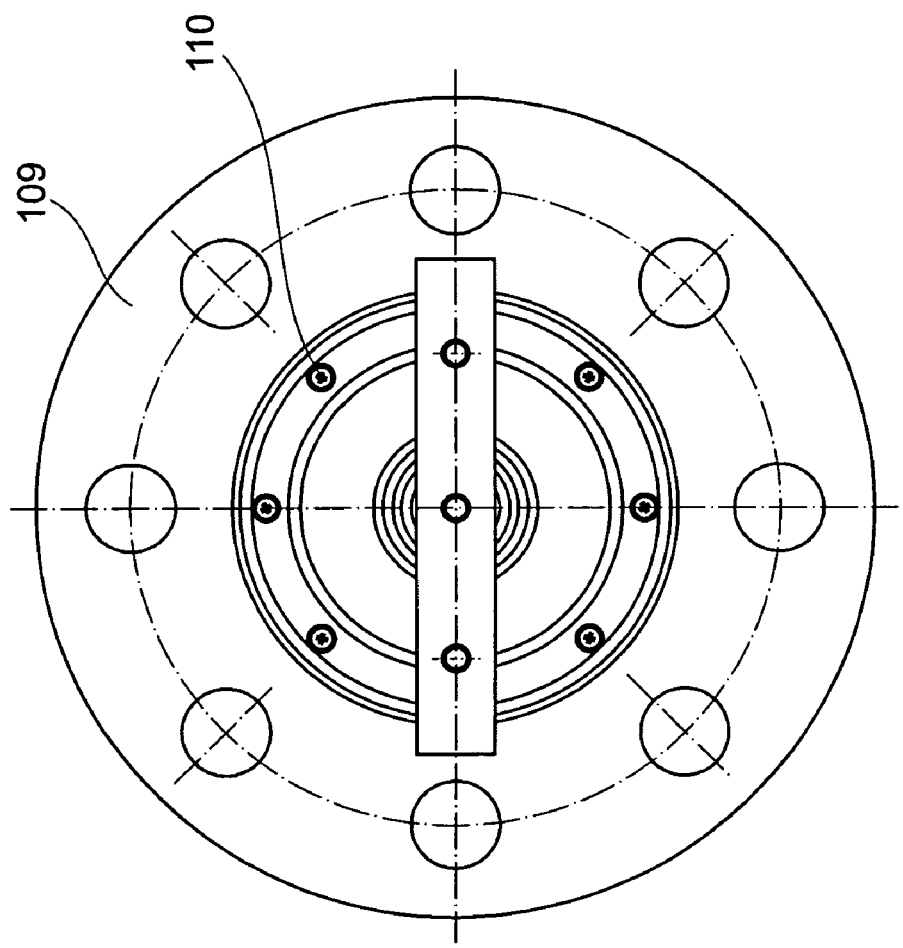
FIG. 2 is a top view of a diagrammatic representation of the fill level radar of FIG. 1.

FIG. 2 is a top view of a diagrammatic representation of the fill level radar of FIG. 1. In particular, the positions of the attachment means 110 are indicated by way of examples. Of course, the boreholes can also be located elsewhere.

Figure 3:
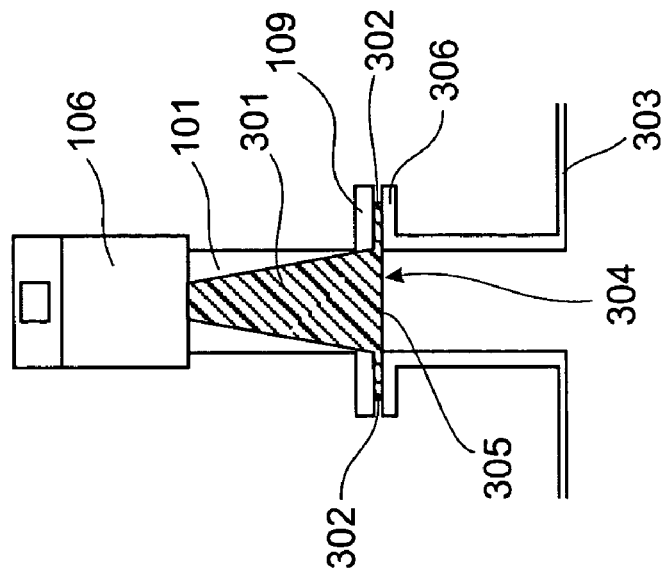
FIG. 3 is a diagrammatic cross-sectional view of a fill level radar, affixed to a container, according to a further exemplary embodiment of the present invention.

FIG. 3 is a diagrammatic cross-sectional view of a fill level radar, affixed to a container 303, according to an exemplary embodiment of the present invention. In this arrangement the plastic antenna 101 has been filled with a dielectric medium 301, which is used for stabilising and sealing-off the antenna system.

The fill level radar is flanged to the container by way of its flange 109. To this effect the attachment flange 306 is provided on the container. The dielectric 301 is squeezed between the two flanges 109, 306 so that a sealed connection results when the two flanges are pressed against each other. In this arrangement proper sealing is supported by the seal 302.

Figure 5:
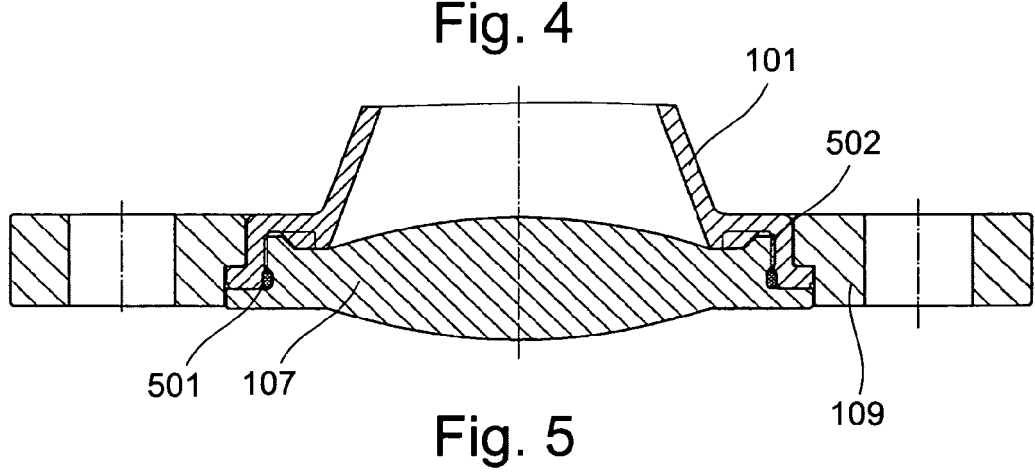
FIG. 5 shows a connection between the lens and the antenna body, according to a further exemplary embodiment of the present invention.

A connection between the lens 107 and the antenna body 101 may be established by screwing, gluing, ultrasonic welding, collar element welding or by way of some other plastic processing technique. Other connections as shown in FIG. 5 may also be possible.

Figure 4:
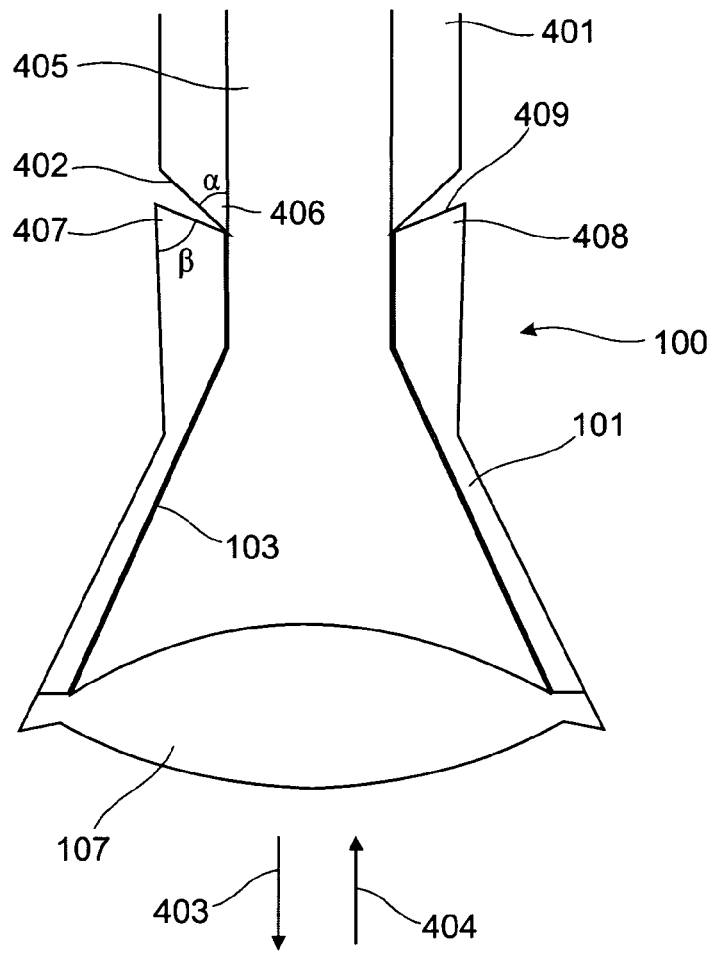
FIG. 4 is a diagrammatic cross-sectional view of a plastic antenna, connected to a waveguide, according to a further exemplary embodiment of the present invention.

FIG. 4 is a diagrammatic cross-sectional view of a metallised plastic antenna, connected to a waveguide 401, according to a further exemplary embodiment of the present invention.

To this effect the plastic antenna 100 comprises a collar 408 which comprises a connection region 409 of corresponding conical shape. The waveguide 401 comprises a region 402 which is designed for connecting the waveguide 401 to the connection region 409 of the plastic antenna 100. The feed line 401 is for example made of metal and is screwed or glued onto the antenna collar 408. The antenna collar 408 and the waveguide end 402 comprise different conical angles 407, 406. The integrity of the seal between the waveguide 401 and the antenna 100 can thus be improved without any materials conveyance being possible, at the connection, between the surroundings and the interior of the waveguide 405. By corresponding contact pressure, during installation of the waveguide 401, to the antenna 100 and if necessary by gluing, the gap between the waveguide 401 and the antenna collar 408 may be minimised so that the radar waves may be conveyed without any loss.

Of course other connections between the waveguide 401 and the antenna collar 408 may also be possible, such as for example corresponding indentations, so that the two parts can engage with each other. Plane support arrangements may also be possible.

FIG. 5 shows a connection between the lens 107 and the antenna body 101, according to a further exemplary embodiment of the present invention. Attachment of the lens 107 to the antenna body 101 takes place, for example, with a thread on the outside 502 of the lens. There is thus no need for any screws or glued connections. Furthermore, a sealing ring 501 is provided.

Implementation of the invention is not limited to the preferred embodiments shown in the figures. Instead, a multitude of variants are imaginable which use the solution shown and the principle according to the invention even in the case of fundamentally different embodiments.

In addition it should be pointed out that "comprising" does not exclude other elements or steps, and "a" or "one" does not exclude a plural number. Furthermore, it should be pointed out that characteristics or steps which have been described with reference to one of the above exemplary embodiments may also be used in combination with other characteristics or steps of other exemplary embodiments described above. Reference characters in the claims are not to be interpreted as limitations.

What is claimed is:

1. A metallised plastic antenna for a fill level radar, comprising:
an antenna body made of a plastic material; and
a collar having a connection region, wherein an inside of the antenna body includes metallisation adapted for conducting electromagnetic waves, and
wherein the connection region of the collar includes a first angle in relation to the longitudinal axis of the collar such that the connection region can be placed against a waveguide so as to provide a seal.

2. The metallised plastic antenna according to claim 1, wherein the inside of the antenna body forms a hollow space; wherein the hollow space comprises an aperture; and wherein the hollow space is filled at least in part with a filler that closes off the aperture of the hollow space.

3. The metallised plastic antenna according to claim 1, wherein the filler comprises a dielectric material.

4. The metallised plastic antenna according to claim 1, wherein the frequency of the electromagnetic waves is between 50 gigahertz and 100 gigahertz.

5. The metallised plastic antenna according to claim 1, wherein the frequency of the electromagnetic waves is between 75 gigahertz and 85 gigahertz.

6. The metallised plastic antenna according to claim 1, wherein the frequency of the electromagnetic waves is between 5 gigahertz and 30 gigahertz.

7. The metallised plastic antenna according to claim 1, wherein the plastic antenna is designed as one of a horn antenna and as a parabolic antenna.

8. The metallised plastic antenna according to claim 1, wherein the antenna body comprises glass-fibre reinforced plastic.

9. The metallised plastic antenna according to claim 1, wherein the antenna body comprises polybutylene theraptha-late and glass fibre.

10. The metallised plastic antenna according to claim 8, wherein the glass fibre content in the antenna body is between 25% and 35%.

11. The metallised plastic antenna according to claim 1, wherein metallisation of the inside of the antenna body comprises a varnish coating that has been enriched with conductive elements.

12. The metallised plastic antenna according to claim 11, wherein the varnish coating comprises a metal-filled conductive varnish.

13. The metallised plastic antenna according to any one of the preceding claims, wherein metallisation of the inside of the antenna body has been applied as a high vacuum vapour-deposit layer.

14. The metallised plastic antenna according to claim 1, wherein metallisation of the inside of the antenna body has been applied as a chemical electroplating layer.

15. The metallised plastic antenna according to claim 1, further comprising: an encapsulation for closing off the aperture of the hollow space; wherein the encapsulation serves to provide chemical protection to the inside of the antenna body from external influences.

16. The metallised plastic antenna according to claim 15, wherein encapsulation is designed as a lens for focussing the electromagnetic waves.

17. The metallised plastic antenna according to claim 1, wherein the connection region of the plastic antenna is rotationally symmetrical in relation to the longitudinal axis of the collar.

18. The metallised plastic antenna according to claim 1, further comprising a second layer; wherein the second layer is arranged between the metallisation and the antenna body.

19. The metallised plastic antenna according to claim 1, further comprising a third layer; wherein the third layer is arranged on the metallisation.

20. A fill level radar for determining the fill level in a tank, comprising:
a plastic antenna according to claim 1 for at least one of transmitting receiving electromagnetic waves; and
a waveguide feeding the electromagnetic waves to the antenna,
wherein the waveguide includes a region for connecting the waveguide to the connection region of the plastic antenna;
wherein the region of the waveguide in the connected state includes a second angle in relation to the longitudinal axis of the collar of the plastic antenna;
wherein the connection region of the plastic antenna includes a first angle in relation to the longitudinal axis of the collar of the lastic antenna which first angle is larger than the second angle; and
wherein the connection region of the plastic antenna can be placed against the region of the waveguide so as to provide a seal.

21. The use of a plastic antenna according to claim 1 for fill level measuring.

22. A method for producing a plastic antenna according to claim 1, comprising the steps of: providing an antenna body from a plastic, with an inside; metallisation of the inside of the antenna body for conducting electromagnetic waves.

23. The method according to claim 22, further comprising the step of: plasma activation of the inside prior to metallisation; wherein metallisation involves a step selected from the group comprising varnish coating, high-vacuum vapour depositing, and chemical electroplating.

24. The method according to claim 22, further comprising the step of: applying a second layer to the inside of the antenna body prior to metallisation.

25. The method according to claim 22, further comprising the step of: applying a third layer to the metallisation of the antenna body.

* * * * *

UNITED STATES PATENT AND TRADEMARK OFFICE
CERTIFICATE OF CORRECTION

PATENT NO. : 7,872,610 B2  
APPLICATION NO. : 11/601228  
DATED : January 18, 2011  
INVENTOR(S) : Motzer et al.

Page 1 of 1

It is certified that error appears in the above-identified patent and that said Letters Patent is hereby corrected as shown below:

On the Title page, Item 75 the list of Inventors should be replaced with the following:

Juergen MOTZER, Gengenbach (DE);

Josef FEHRENBACH, Haslach (DE);

Klaus KIENZLE, Zell am Harmersbach (DE);

Christian SUM, Wolfach Germany (DE); and

Thomas DECK, Wolfach Germany (DE);

Signed and Sealed this  
Third Day of March, 2015

Michelle K. Lee  
*Deputy Director of the United States Patent and Trademark Office*